July 18, 1967 A. J. ANTHONY ET AL 3,331,749

NUCLEAR REACTOR FUEL ASSEMBLIES

Filed Dec. 2, 1965

INVENTOR.
ANDREW J. ANTHONY
MANUEL B. LOUREIRO
BY Richard H. Berneike
ATTORNEY

United States Patent Office 3,331,749
Patented July 18, 1967

3,331,749
NUCLEAR REACTOR FUEL ASSEMBLIES
Andrew J. Anthony, Tariffville, and Manuel B. Loureiro, East Hartford, Conn., assignors to Combustion Engineering, Inc., Windsor, Conn., a corporation of Delaware
Filed Dec. 2, 1965, Ser. No. 511,137
4 Claims. (Cl. 176—78)

The present invention relates to nuclear reactors and more particularly to a novel fuel element assembly arrangement. The invention more specifically relates to means for supporting and attaching the fuel elements in the assemblies.

It is well known that the fuel or fissionable material for heterogeneous nuclear reactors is frequently contained in a number of thin-walled tubes forming fuel elements or rods which may be grouped and joined together into fuel element assemblies or bundles. Each reactor has a number of such fuel assemblies therein comprising the reactor core.

The design of the fuel element assemblies and particularly the technique of attaching the fuel elements into the assemblies presents some unique problems. The flux distribution across a single fuel assembly will frequently vary significantly such that the fuel elements in one portion of the assembly will be at a higher temperature than those in another portion. This will, of course, result in the unequal thermal expansion of the elements in the longitudinal direction. This unequal expansion should be unrestrained in order to prevent the establishment of excessive stresses and bowing in the fuel elements and in the assemblies as a whole. Therefore, the elements should not be entirely rigidly attached in the assembly relative to each other.

The fuel elements are conventionally rather long, thin tubes arranged in a spaced array in the assemblies, the ends being attached to end support plates. Since the elements are of relatively great length as compared not only to their individual diameters but also as to the lateral dimension of the fuel assembly, it has become the practice to provide lateral spacing and support means along the length of the fuel assembly at selected locations. These spacing and support means prevent any bowing of the fuel elements and maintain the elements in parallel alignment as is necessary for proper reactor operation. The fact that the elements must be free to undergo unequal thermal expansion means that the spacing and support means cannot be directly attached to the fuel elements but rather that the elements must be free to slide longitudinally relative to the spacing and support means. Such spacing and support means per se form no part of the present invention and such means are illustrated in U.S. Patents 3,182,003, issued May 4, 1965, and 3,137,638, issued June 16, 1964, and in the U.S. patent application of Andrew J. Anthony and Adolph W. Viets, Jr., Ser. No. 488,852, filed Sept. 21, 1965. The use of such support means does, however, present one problem which is alleviated by the present invention. The fuel elements are flexible as previously discussed and for this reason tend to vibrate during operation. This vibration, which the spacing and support means are designed to reduce, tends to cause fretting corrosion of the fuel elements particularly at the point of contact with the spacing and support means. Fretting corrosion may also be encountered at the ends of the fuel elements at the points where they are supported in the assembly. The problem of fretting is particularly severe at the lower end of the fuel assembly which is in a more highly turbulent flow region or a region in which vibration forces are more severe. It is therefore necessary to attach the fuel elements in the assemblies in a manner that provides even more support than afforded by intermediate spacing and support means.

Welding and bolting to the end support plates are two prior art schemes for fastening the fuel elements into the fuel assemblies. Although each of these methods results in rigid connections, they both present significant problems. Each of these two techniques involves considerable time and expense. The lower end support plate is frequently employed to locate the fuel assembly in the core and as such must be very accurately machined, perhaps within a tolerance of a few mils. Welding the fuel elements to this rather thick end support plate could readily cause enough distortion of the plate to cause the fuel assembly to be out of alignment. There is also the possibility of uncertainty in the weld quality.

Bolting each of the fuel elements requires that the torque be accurately adjusted since either rupture or a loose element could otherwise occur particularly upon thermal expansion of Zircaloy fuel rods in stainless steel end support plates. Bolting also requires some sort of locking means to hold the nuts in position. One such means is welding which results in additional fabrication time and expense. The nuts might also have to be of special materials to compensate for the differential expansion problems of a Zircaloy fuel element passing through a stainless steel end support plate.

An object of the present invention is therefore to provide a novel fuel element assembly construction.

A more specific object of the invention is to provide a technique for fastening the fuel elements into the fuel assemblies to firmly anchor the elements and reduce vibration and the resultant corrosion and yet permit the elements to undergo unrestrained and unequal thermal expansion.

These and other features, advantages and objects of the present invention will be explained more fully in, and will be apparent from, the following description of the invention when read in conjunction with the accompanying drawings wherein.

Figure 1:
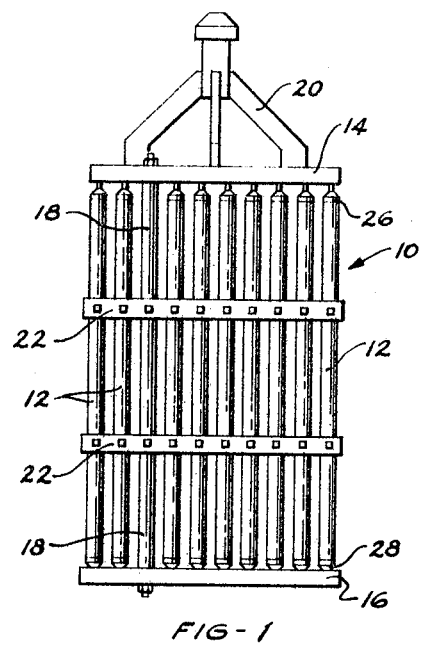
FIG. 1 is a general elevation view of a fuel assembly or bundle of the present invention.

Referring first to FIG. 1 of the drawings, there is illustrated a fuel assembly or fuel bundle 10 comprising a plurality of fuel elements or rods 12. The fuel elements in the assembly are spaced from each other and maintained in a spaced array by means of upper and lower end support plates 14 and 15, respectively. These end support plates are held in position with respect to each other by means of rods 18 which extend between the two end support plates and are bolted thereto. Any number of these connecting rods may be employed to give the proper support. Attached to the upper end support plate 14 is a cruciform 20 which serves as a lifting fixture as well as an aligning means for the upper end of a fuel assembly.

The spacing and support means 22 which serve to laterally join the intermediate portions of the individual fuel elements together are shown in FIG. 1 between the upper and lower end support plates. Although two of these spacers have been illustrated, there could be any number necessary to provide the required support. These spacers maintain the fuel elements in parallel alignment and prevent undue vibration of the elements during operation. They may be attached to the rods 18 to hold them in position along the length of the fuel assemblies. The details of construction of suitable spacing and support means are contained in the previously mentioned Patents 3,182,003 and 3,137,638 and in the mentioned patent application of Andrew J. Anthony and Adolph W. Viets, Jr.

Figure 2:
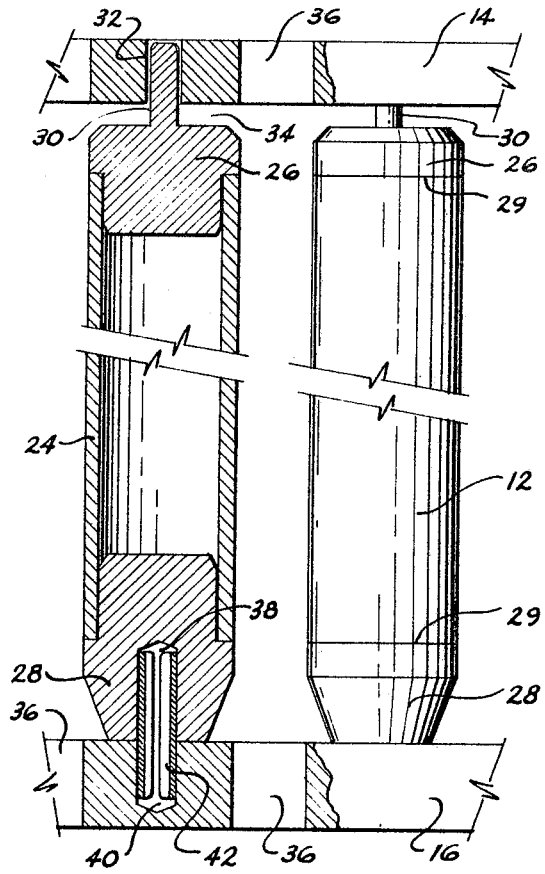
FIG. 2 is a detailed view partially in cross section of a portion of a fuel assembly incorporating the present invention.

FIG. 2 illustrates the manner in which the fuel elements are attached in the fuel assembly according to the present invention. The fuel elements comprise tubes 24 which may be formed of a material such as Zircaloy and which contain the fissionable material. The upper and lower ends of the tube are closed by means of end caps 26 and 28, respectively. These caps, which may be of Zircaloy as are the tubes, are welded to the tubes as at 29. The upper end cap 26 has an extension 30 thereon which protrudes into a hole 32 in the upper end support plate 14. There is sufficient clearance between the extension 30 and the hole 32 so as to permit the extension to freely move longitudinally in the hole throughout all operating conditions. This arrangement plus the gap 34 between the end cap 26 and the upper end support plate 14 permits the fuel elements to undergo unrestrained and unequal thermal expansion. Holes 36 in the upper and lower end support plates provide the coolant flow path through the support plates.

Figure 3:
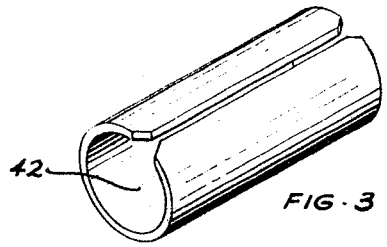
FIGS. 3 and 4 are perspective views of two forms of the spring pin attaching means.

The end caps 28 at the lower ends of the fuel elements have blind holes 38 formed therein. The end support plate 16 also has holes 40 formed therein opposite the holes 38. Spring pins 42 extends partially into the holes in the end plate and partially into the holes in the end caps thereby forming the attaching means for the fuel elements. The spring pins which are illustrated in detail in FIG. 3 are slotted, tubular pins having a C-shaped cross section and they are commercially available items preferably formed of stainless steel. The Precision Fastener Division of Standard Pressed Steel Co. produces such pins under the name of Sel-Lok. The spring pins are larger in diameter than the holes 38 and 40 in the relaxed state such that they must be compressed during assembly. The pins thereby firmly lock the fuel elements to the lower end support plate 16. The pins normally have a smooth lead-in chamfer so that assembly may be readily accomplished by press fitting the pins into the holes. It can be seen that this method of assembly is far simpler than bolting or welding.

Figure 4:
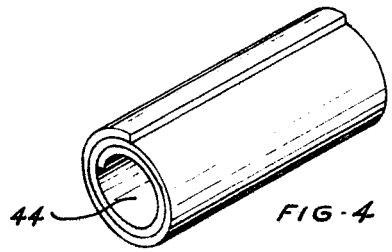

FIG. 4 illustrates an alternative type of spring pin 44 which may be employed in the present invention. This type of spring pin is known as a spiral spring pin and is also commercially available such as from the C.E.M. Company, Inc., under the name of Spirol spring pins. These spiral pins can be fitted to holes having greater tolerances than can conventional slotted tubular pins. Thus the drilling of the holes would not have to be as accurate. Both types of spring pins contribute some shock absorbing, vibration dampening resilience to the connection between the members due to the spring effect. Thus the transmission of vibrations is reduced. The slight clearance between the multiple coils of the spiral pins acts to absorb more shock or vibration than the slotted tubular pins.

Although the invention has been described with reference to a specific arrangement of the fuel elements in the fuel assemblies and with reference to specific types of spring pins for fastening the fuel elements in the fuel assemblies it is obvious that numerous modifications of the invention can be made by those skilled in the art without departing from the spirit and scope of the invention as set forth in the appended claims.

We claim:
1. A nuclear fuel element assembly comprising a plurality of longitudinally extending fuel elements, an end support plate adjacent one end of said fuel elements, said one end of each of said fuel elements having a hole therein, said end support plate having holes therein adjacent said holes in said fuel elements, spring pins extending partially into said holes in said fuel elements and partially into said holes in said end support plate to attach said fuel elements to said end support plate.

2. A nuclear fuel element assembly as claimed in claim 1 wherein said spring pins comprise slotted, tubular pins having a C-shaped cross section.

3. A nuclear fuel element assembly as claimed in claim 1 wherein said spring pins comprise spiral spring pins.

4. A nuclear fuel element assembly comprising two spaced end support plates, a plurality of fuel elements extending between said end support plates, a first end of each of said fuel elements having a hole therein, the end support plates adjacent said first end having holes therein adjacent said holes in said fuel elements, spring pins extending partially into said holes in said fuel elements and partially into said holes in said end support plate to attach said fuel elements to said end support plate, a second end of each of said fuel elements having an extension thereon, said end support plate adjacent said second end having holes therein adjacent said extensions, said extensions protruding into said holes, said holes being larger in diameter than said extensions whereby said extensions will be free to move in said holes upon thermal expansion of said fuel elements.

References Cited

UNITED STATES PATENTS

| | | | |
|---|---|---|---|
| 2,905,338 | 9/1959 | Koch | 176—30 X |
| 3,057,793 | 10/1962 | Coates et al. | 176—30 X |
| 3,134,722 | 5/1964 | Hespel et al. | 176—30 X |
| 3,164,530 | 1/1965 | Banks | 176—78 X |

L. DEWAYNE RUTLEDGE, *Primary Examiner.*

BENJAMIN R. PADGETT, *Examiner.*

M. J. SCOLNICK, *Assistant Examiner.*